(12) United States Patent
Broden

(10) Patent No.: US 7,819,014 B1
(45) Date of Patent: Oct. 26, 2010

(54) CAPACITIVE GAGE PRESSURE SENSOR WITH VACUUM DIELECTRIC

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/428,968

(22) Filed: Apr. 23, 2009

(51) Int. Cl.
*G01L 9/12* (2006.01)

(52) U.S. Cl. ...................................... 73/718

(58) Field of Classification Search ........... 73/718, 73/724; 361/283; 29/25.42
See application file for complete search history.

(56) References Cited

U.S. PATENT DOCUMENTS

| | | | | |
|---|---|---|---|---|
| 3,619,742 A | * | 11/1971 | Rud, Jr. ................. | 361/283.1 |
| 4,336,567 A | * | 6/1982 | Anastasia ............... | 361/283.3 |
| 4,578,735 A | * | 3/1986 | Knecht et al. ........... | 361/283.4 |
| 5,381,299 A | * | 1/1995 | Provenzano et al. ..... | 361/283.4 |
| 5,448,444 A | * | 9/1995 | Provenzano et al. ..... | 361/283.4 |
| 7,124,641 B2 | | 10/2006 | Broden et al. | |
| 2004/0025594 A1 | | 2/2004 | Broden et al. | |
| 2005/0016286 A1 | | 1/2005 | Broden et al. | |
| 2005/0204822 A1 | | 9/2005 | Schumacher | |
| 2007/0245829 A1 | | 10/2007 | Sittler et al. | |

FOREIGN PATENT DOCUMENTS

GB 2005839 A 4/1979

OTHER PUBLICATIONS

Notification of Transmittal of the International Search Report and the Written Opinion for International application No. PCT/US2010/025857 dated Jun. 8, 2010.

* cited by examiner

*Primary Examiner*—Jewel Thompson
(74) *Attorney, Agent, or Firm*—Christopher R. Christenson; Westman, Champlin & Kelly, P.A.

(57) ABSTRACT

A field device includes a capacitive gauge pressure sensor configured to measure a gage pressure of a process media. A sensor body of the pressure sensor includes first and second chambers. The second chamber is under vacuum and forms a vacuum dielectric for the pressure sensor. An atmospheric reference port is formed in the sensor body and maintains the first chamber in equilibrium with ambient atmospheric pressure. A process media inlet port of the sensor is configured to couple to a process media source. The sensor includes a conductive deflectable diaphragm between the second chamber and the media inlet port. A capacitive plate is disposed in the second chamber in relation to the diaphragm such that deflection of the diaphragm generates a change in capacitance. The field device also includes sensor circuitry which generates a sensor signal indicative of the gage pressure of the process media, and transmitter circuitry which transmits information relative to the sensor signal over a process communication loop.

20 Claims, 5 Drawing Sheets

CAPACITIVE GAGE PRESSURE SENSOR WITH VACUUM DIELECTRIC

BACKGROUND

Field devices, such as process variable transmitters, are used in the process control industry to remotely sense process variables. One type of field device or process variable transmitter includes a capacitive pressure sensor for monitoring a process pressure.

Various dielectric materials have been used in these capacitive pressure sensors. For example, fluid filled constructions are sometimes employed in which an oil or other fluid is used as the dielectric material. In other constructions, it is desired to use a vacuum as the dielectric material. Vacuum dielectrics can be of lower complexity constructions, can reduce costs, are non-oil filled, can be more accurate, and/or can be more stable. However, because of the vacuum dielectric construction, these sensors typically only measure absolute pressure, and not the gage pressure of the process (e.g., the process pressure relative to a local pressure, such as the surrounding atmospheric or barometric pressure). Gage pressure is also sometimes known as "gauge" pressure.

Prior pressure sensor configurations for measuring the gage pressure of a process have utilized a number of different approaches. For example, high pressure sensors have been sold as sealed packages, with a calibrated pressure offset built-in to approximate gage pressure. Other constructions have added a second sensor to measure the barometric pressure, and have adjusted the measured pressure using electronics or software to provide a gage pressure estimate. This adds cost to the pressure sensor. Still other constructions have allowed atmosphere (air) to become the dielectric material, which can result in temperature instability errors and can limit the sensors ability to be used in corrosive environments. With these various attempts commonly having detrimental effects on accuracy, cost, stability or reliability, new pressure sensor configurations which can accurately measure gage pressure of a process without suffering these detrimental effects would be very beneficial.

SUMMARY

A field device includes a capacitive gauge pressure sensor configured to measure a gage pressure of a process media. A sensor body of the pressure sensor includes first and second chambers. The second chamber is under vacuum and forms a vacuum dielectric for the pressure sensor. An atmospheric reference port is formed in the sensor body and maintains the first chamber in equilibrium with ambient atmospheric pressure. A process media inlet port of the sensor is configured to couple to a process media source. The sensor includes a conductive deflectable diaphragm between the second chamber and the media inlet port. A capacitive plate is disposed in the second chamber in relation to the diaphragm such that deflection of the diaphragm generates a change in capacitance. The field device also includes sensor circuitry which generates a sensor signal indicative of the gage pressure of the process media, and transmitter circuitry which transmits information relative to the sensor signal over a process communication loop.

DETAILED DESCRIPTION

Disclosed embodiments address the difficulties in prior capacitive pressure sensor configurations of measuring the gage pressure of a process. Gage pressure is zero referenced against ambient air pressure. In other words, gage pressure of a process is equal to the absolute pressure measured from the process minus atmospheric pressure in the surrounding area.

Disclosed embodiments provide for the measurement of gage pressure without the use of a secondary barometric sensor, while still using a vacuum dielectric to reduce temperature instability and/or to provide other advantages over prior capacitive gage pressure sensor designs.

Figure 1:
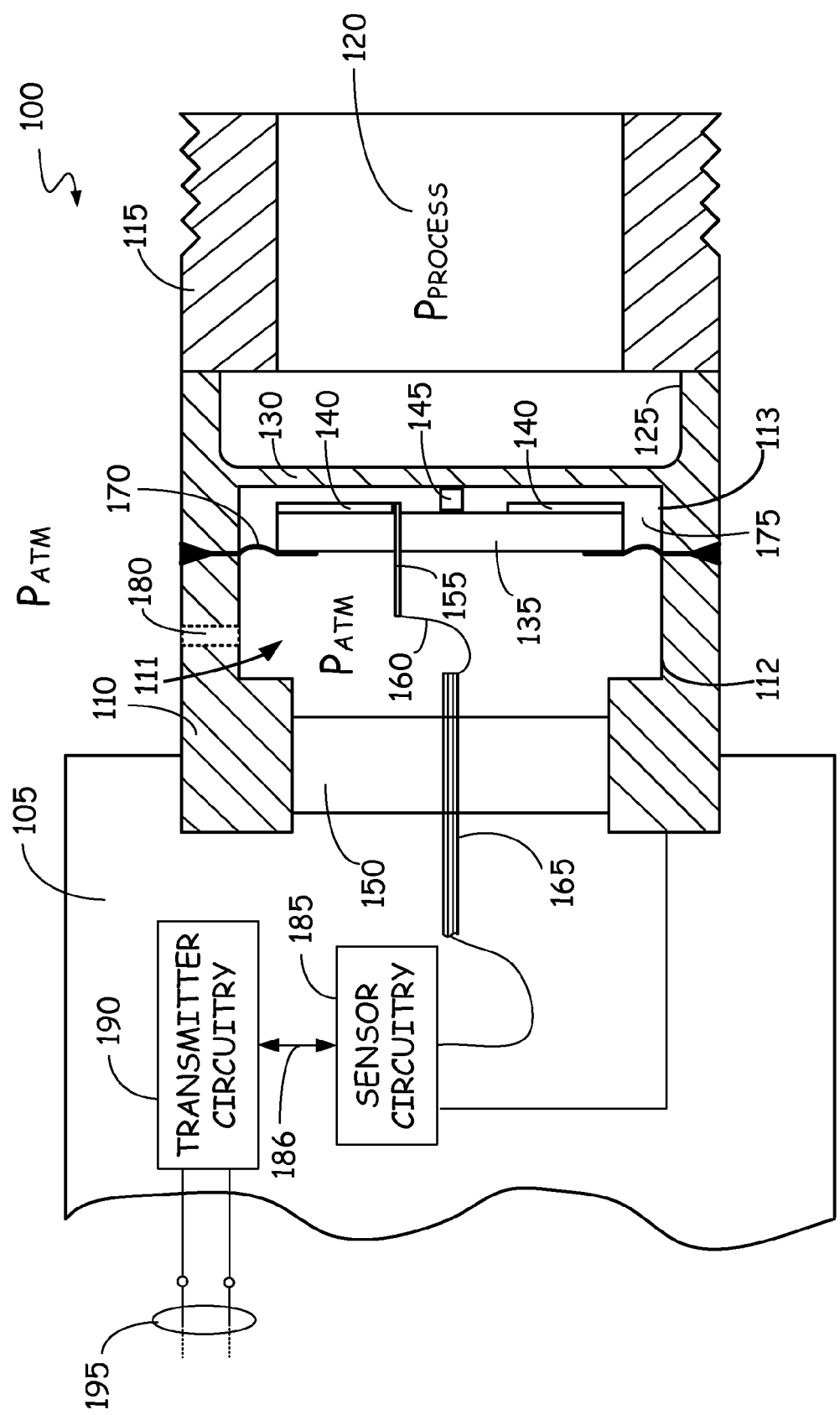
FIG. 1 is a diagrammatic view of a process gage pressure transmitter or field device including disclosed concepts and embodiments.
Figure 2:
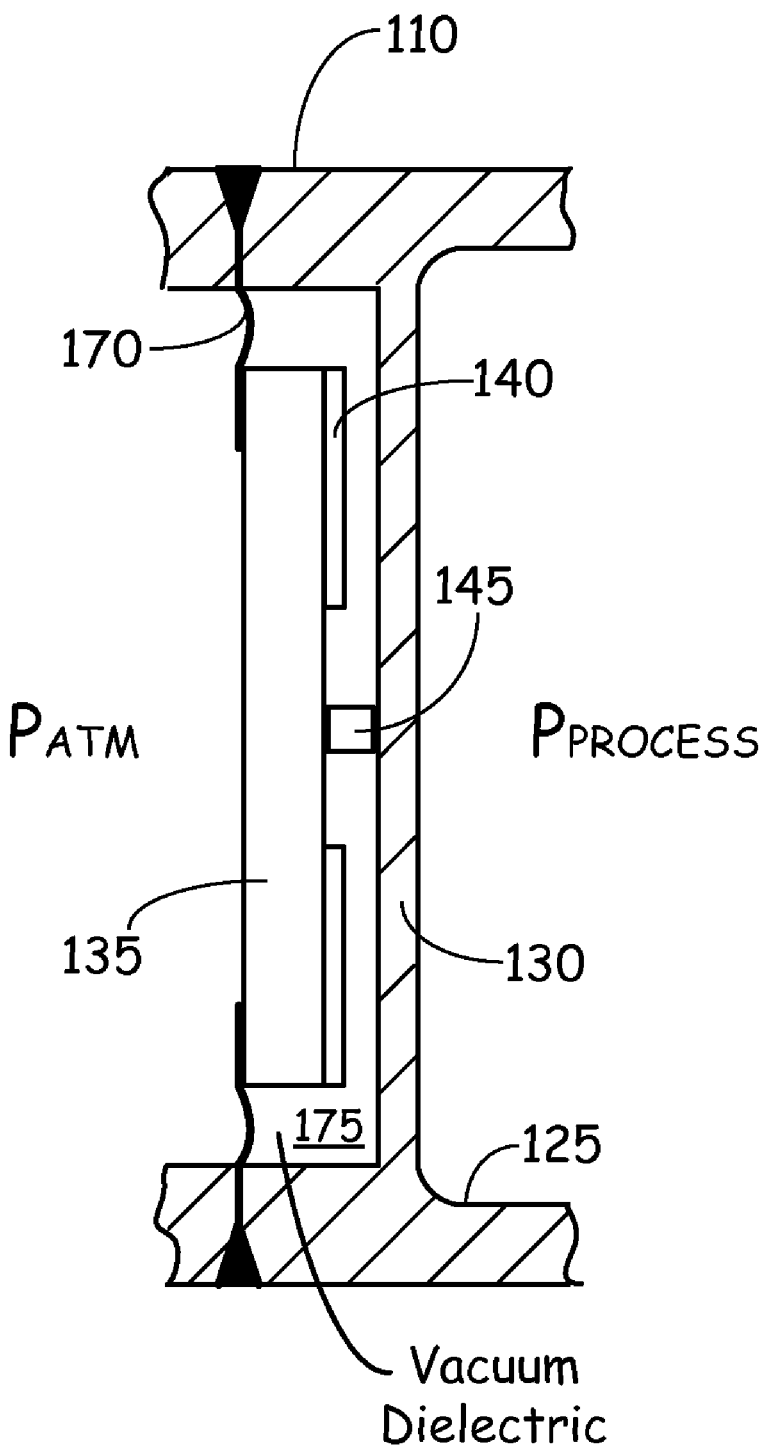
FIG. 2 is a diagrammatic view of a portion of the transmitter shown in FIG. 1.

FIG. 1 illustrates an exemplary capacitive gage pressure transmitter or field device 100 with which disclosed embodiments are useful. FIG. 2 illustrates portions of pressure 100 in greater detail. Pressure transmitter 100 generally includes a transmitter body 105 coupled to a sensor body 110. Transmitter body 105 acts as an electronics housing to house processing and communication circuitry for the transmitter.

Sensor body 110 has a main chamber 111 formed therein. The main chamber 111 includes first and second portions 112 and 113, which are themselves first and second chambers formed within the sensor body. Sensor body 110 houses a capacitive gage pressure sensor in accordance with disclosed embodiments. Alternatively, transmitter body 105 and sensor body 110 can be formed as an integral instrument.

Sensor body 110 is configured to be coupled to a process container or passageway to measure a gage pressure of a process fluid or media 120. In an example embodiment, sensor body 110 has, or is coupled to, a fitting 115 which provides access to the source of process media 120. Fitting 115 is adjacent an inlet port 125 having a sensing diaphragm 130 positioned therein such that the process media is in contact with the sensing diaphragm. Sensing diaphragm 130 is a conductive deflectable diaphragm disposed between the second portion or chamber 113 and the process media inlet port 125.

Also within sensor body 110 is an insulator body 135, which can be a ceramic insulator, for example. An insulator 150, which can be a glass-to-metal header material, seals the sensor body with chambers 112 and 113 formed therein. One or more capacitive plates or metal electrodes 140 are disposed on the insulator body 135 in the second chamber 113 relative to the conductive deflectable diaphragm 130 such that deflection of the diaphragm generates a change in capacitance between the electrode 140 and the diaphragm 130. In an example embodiment, metal electrode is a ring. The capacitance, or the change in capacitance, can be correlated to gage pressure of the process media 120, and therefore is indicative of the gage pressure of the process media. A low expansion spacer 145 can be positioned between the insulator body 135 and the conductive deflectable diaphragm 130 to facilitate deflection of the diaphragm 130 when exposed to pressure of the process media 120, and in response to atmospheric pressure.

Figure 3:
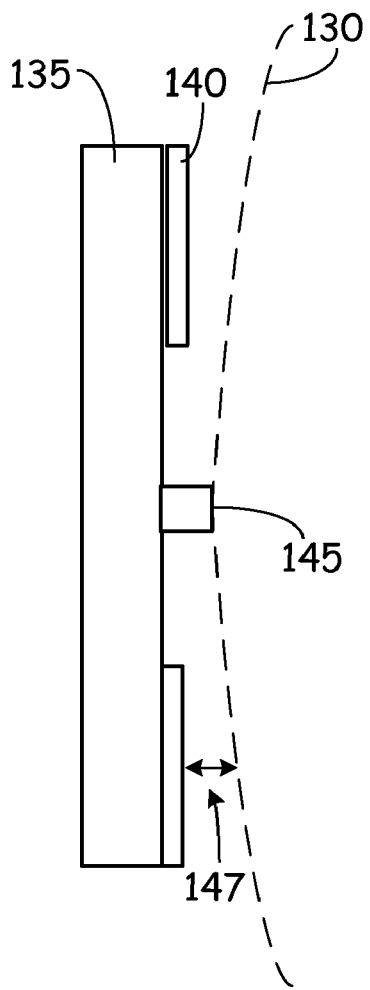
FIG. 3 is a diagrammatic view of a portion of the transmitter shown in FIG. 1, illustrating a sensing diaphragm deflecting in response to process pressure to change a gap between a capacitive plate electrode and the sensing diaphragm.
Figure 4:
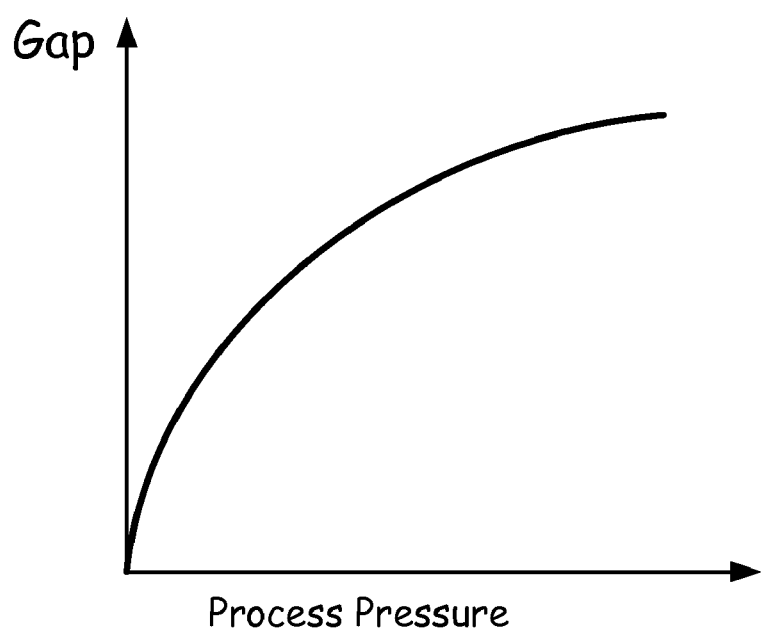
FIG. 4 is a plot illustrating a gap between a capacitive plate electrode and the sensing diaphragm, shown in FIG. 3, as a function of process pressure.

Referring for the moment to FIG. 3, shown is a diagrammatic illustration of a portion of transmitter 100 illustrating diaphragm 130 deflected in the presence of pressure from a process media. With spacer 145 maintaining contact with diaphragm 130, the gap 147 between electrode 140 and diaphragm 130 increases or decreases. An example of a relationship between the gap 147 and the process gage pressure is plotted in FIG. 4. As the process gage pressure bows the diaphragm away from the electrode(s) 140, the capacitance between the electrode(s) 140 and diaphragm 130 decreases. The capacitance change is inversely related to the gap curve shown in FIG. 4, with capacitance decreasing as increased gage pressure causes larger gaps.

Referring back to FIG. 1, shown is a pin 155 which provides electrical connection to electrode 140. Pin 155 can extend through insulator 135. In the illustrated embodiment, a flexible lead 160 electrically connects between pin 155 and an electrode lead 165. Electrode lead 165 electrically couples to sensor circuitry 185. Sensor circuitry 185, coupled to the capacitive gage pressure sensor (i.e., via connection to electrode 140 and to the sensor body), is configured to generate a sensor signal 186 based upon the capacitance of the capacitive gage pressure sensor. With the capacitance of the sensor being indicative of gage pressure of the process media, the sensor signal is indicative of gage pressure of the process media. Transmitter circuitry 190 is coupled to the sensor circuitry 185. Transmitter circuitry 190 includes communication circuitry for transmitting information relative to the sensor signal over a process communication loop 195. As shown, sensor circuitry 185 and transmitter circuitry 190 can be housed in transmitter body or electronics housing 105.

In disclosed embodiments, pressure transmitter 100 is capable of measuring gage pressure of the process media 120, while still utilizing a vacuum dielectric and gaining advantages thereof. As shown in FIG. 1, the capacitive gage pressure sensor includes a thin ring diaphragm 170 disposed in the main chamber 111. Thin ring diaphragm 170 can be a foil material, such as a stamped washer which extends around the perimeter of insulator body 135. Example materials for thin ring diaphragm 170 include metals such as stainless steel. Particular materials used for thin ring diaphragm 170 can be chosen based on thermal expansion properties, and depending on how the thin ring diaphragm is to be connected between insulator body 135 and sensor body 110. Thin ring diaphragm 170 must be more flexible than the conductive deflectable diaphragm 130.

In an exemplary embodiment, thin ring diaphragm 170 is brazed or resistance seam welded (RSW) to the insulator body 135 and to the sensor body 110, both of which can be made from a ceramic material. The ceramic material can be metalized in areas where thin ring diaphragm 170 is to be connected.

As can be seen in FIG. 1, thin ring diaphragm 170 and insulator body 135 together separate main chamber 111 into the two smaller chambers or chamber portions 112 and 113. Second chamber 113 is maintained under vacuum, and thus forms a vacuum dielectric 175 for the pressure sensor. An atmospheric reference port 180 is formed in, and extends through, sensor body 110 to maintain the first chamber at an ambient atmospheric pressure $P_{ATM}$. By including atmospheric reference port to maintain the pressure in first chamber 112 of the sensor body in equilibrium with an ambient atmospheric pressure $P_{ATM}$ surrounding (outside) the sensor body of the transmitter or field device, a true gage pressure measurement of the process media 120 can be made. In other embodiments, a slight variation in pressure may exist between the first chamber 112 and the ambient environment surrounding transmitter 100, but the pressure of the first chamber 112 is maintained in close or correlated relation to the ambient atmospheric pressure surrounding the field device.

The design of disclosed embodiments allows the ambient atmospheric pressure to push against the conductive deflectable sensing diaphragm 130 via insulator 135 and spacer 145. Thus, diaphragm 130 acts as a summing junction of the pressure forces, with atmospheric pressure on one side, and the process pressure on the other side. As a result, a true gage pressure can be measured, while maintaining the ability to use a vacuum dielectric. This can aid in achieving temperature stability, limiting the effects of humidity on dielectric properties, and allowing the transmitter to be used in hostile atmosphere environments.

Constructing the transmitter with a vacuum dielectric can be accomplished using a wide variety of different techniques and designs. For example, joining technology is known which allows components to be welded together under vacuum. When thin ring diaphragm 170 is attached to insulator 135 and sensor body 110 under vacuum, the vacuum dielectric 175 is maintained after the transmitter is removed from vacuum.

Figure 5:
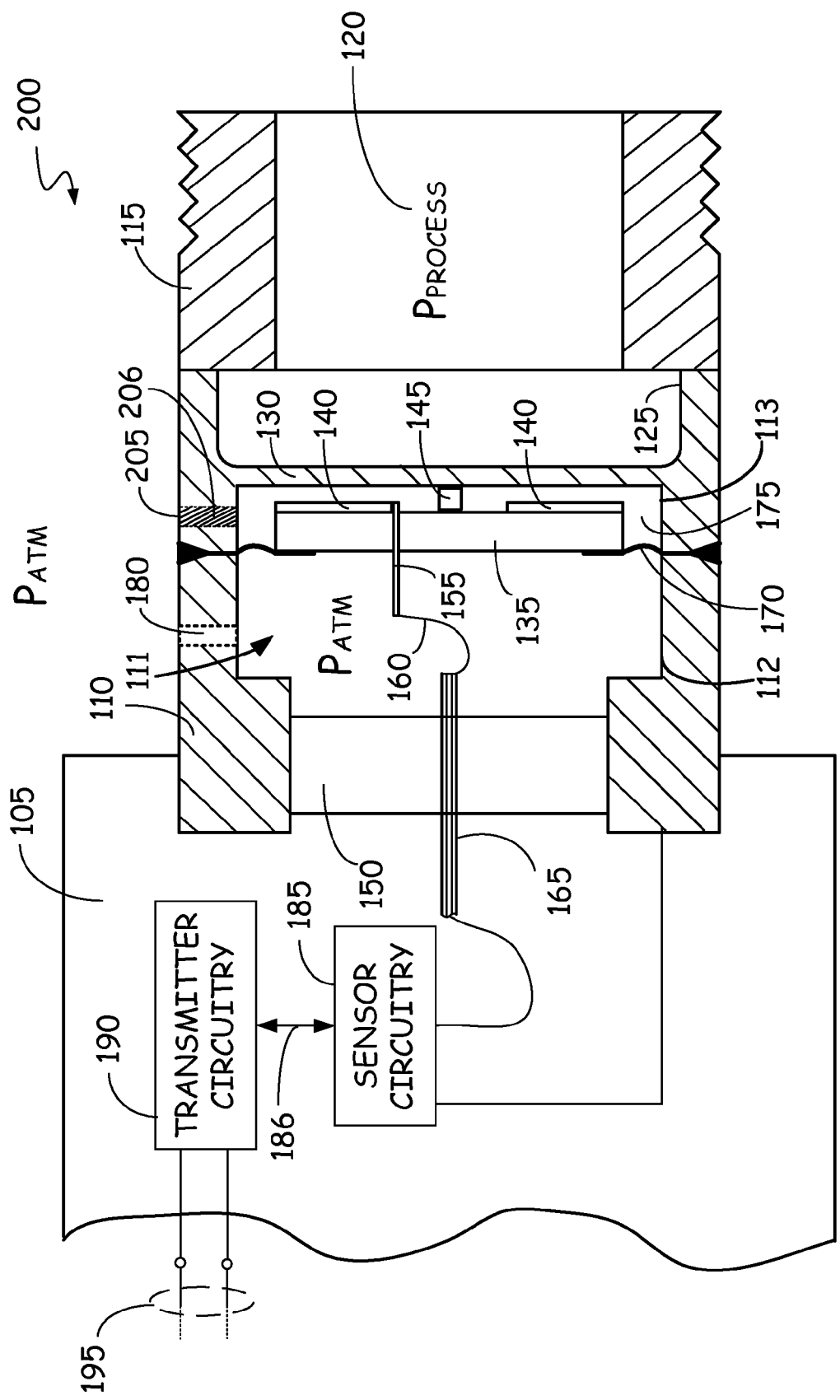
FIG. 5 is a diagrammatic view of a second embodiment of the transmitter shown in FIG. 1, in which an evacuation port is formed in the sensor body.

Using another technique, a vacuum dielectric 175 is formed in a transmitter 200 shown in FIG. 5 using an evacuation port 205. Evacuation port 205 is formed in the sensor body 110, and is used to evacuate the second chamber 113 to form the vacuum dielectric. After removing gases from chamber 113, evacuation port 205 is filled with a permanent or removable material 206 to seal the chamber 113 and maintain vacuum. In some embodiments, material 206 can be a plug or other mechanism for sealing, and optionally unsealing, chamber 113. In other respects, transmitter 200 can be as described with reference to transmitter 100 shown in FIG. 1.

Figure 6:
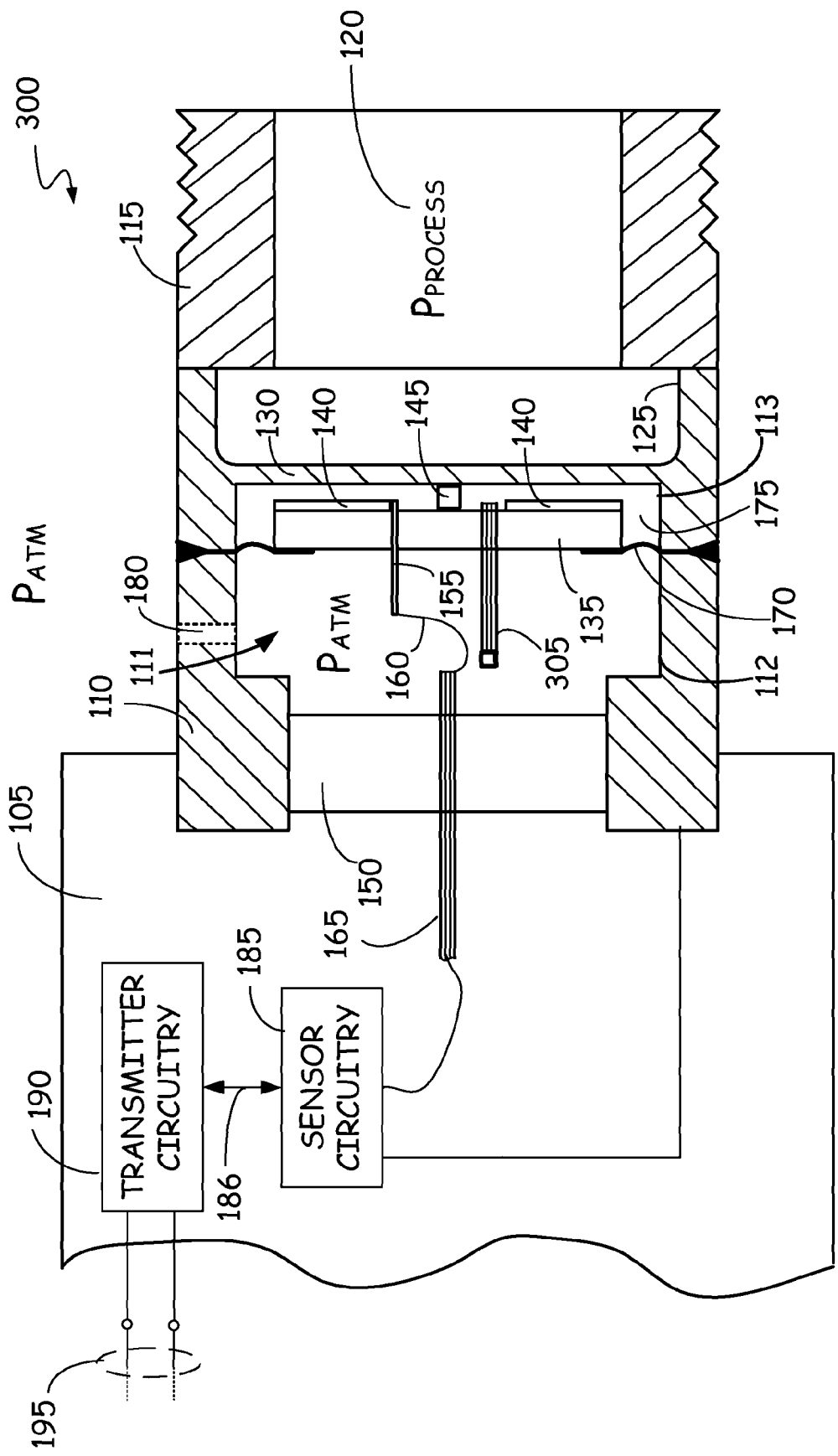
FIG. 6 is a diagrammatic view of a third embodiment of the transmitter shown in FIG. 1, in which an evacuation tube is provided.

Referring now to FIG. 6, shown is another technique for creating vacuum dielectric 175. As shown in FIG. 6, in transmitter 300, an evacuation tube 305 is added for this purpose. In this example embodiment, evacuation tube 305 extends through the first chamber 112 and into the second chamber 113 for evacuation of chamber 113. Evacuation tube 305 can extend, for example, through insulator 135. The evacuation tube 305 can also be routed in other ways as well. After evacuation of chamber 113, the evacuation tube is sealed to maintain the vacuum dielectric. In other respects, transmitter 300 can be as described with reference to transmitter 100 shown in FIG. 1.

Although the present invention has been described with reference to several alternative embodiments, workers skilled in the art will recognize that changes may be made in form and detail without departing from the spirit and the scope of the invention.

What is claimed is:

1. A capacitive gage pressure transmitter, the transmitter comprising:
  a capacitive gage pressure sensor including:
    a sensor body defining a main chamber therein;
    a thin ring diaphragm disposed in the main chamber and dividing the main chamber into first and second portions, the second portion being under vacuum and forming a vacuum dielectric;

an atmospheric reference port formed in the sensor body and maintaining the first portion of the chamber at an ambient atmospheric pressure;

a process media inlet port configured to couple to a source of process media;

a conductive deflectable diaphragm disposed between the second portion of the chamber and the process media inlet port; and at least one capacitive plate disposed in the second portion of the chamber relative to the diaphragm such that deflection of the conductive deflectable diaphragm generates a change in capacitance between the at least one capacitive plate and the conductive deflectable diaphragm, the capacitance being indicative of gage pressure of the process media.

2. The transmitter of claim 1, and further comprising:

sensor circuitry electrically coupled to the capacitive gage pressure sensor to generate a sensor signal based upon the capacitance of the capacitive gage pressure sensor, the sensor signal being indicative of gage pressure of the process media; and transmitter circuitry coupled to the sensor circuitry to transmit information relative to the sensor signal over a process communication loop.

3. The transmitter of claim 2, and further comprising an electronics housing coupled to the sensor body, the sensor circuitry and the transmitter circuitry being positioned in the electronics housing.

4. The transmitter of claim 1, and further comprising an insulator body positioned in the second portion of the chamber, the at least one capacitive plate being disposed on the insulator body.

5. The transmitter of claim 4, and further comprising a low expansion spacer positioned between the insulator body and the conductive deflectable diaphragm to facilitate deflection of the conductive deflectable diaphragm when exposed to pressure of the process media.

6. The transmitter of claim 1, and further comprising an evacuation port formed in the sensor body for evacuating the second portion of the chamber.

7. The transmitter of claim 1, and further comprising an evacuation tube extending through the first portion of the chamber into the second portion of the chamber for evacuating the second portion of the chamber.

8. A field device for use in an industrial process, the field device comprising:

a capacitive gage pressure sensor configured to measure a gage pressure of a process media, the gage pressure sensor including:

a sensor body having first and second chambers formed therein, the second chamber being under vacuum and forming a vacuum dielectric for the gage pressure sensor;

an atmospheric reference port formed in the sensor body and maintaining the first chamber in equilibrium with an ambient atmospheric pressure surrounding the field device;

a process media inlet port configured to couple to a source of process media;

a conductive deflectable diaphragm disposed between the second chamber and the process media inlet port; and a capacitive plate disposed in the second chamber in spaced apart relation to the conductive deflectable diaphragm such that deflection of the conductive deflectable diaphragm generates a change in capacitance, wherein the capacitance is indicative of gage pressure of the process media;

sensor circuitry electrically coupled to the gage pressure sensor and configured to generate a sensor signal indicative of the gage pressure of the process media; and transmitter circuitry coupled to the sensor circuitry to transmit information relative to the sensor signal over a process communication loop.

9. The field device of claim 8, and further comprising:

an insulator body positioned in the sensor body, the capacitive plate being disposed on the insulator body; and a thin ring diaphragm physically coupled between the insulator body and the sensor body, wherein the insulator body and the thin ring diaphragm separate the first chamber at the ambient atmospheric pressure from the second chamber providing the vacuum dielectric.

10. The field device of claim 9, and further comprising a low expansion spacer positioned between the insulator body and the conductive deflectable diaphragm to facilitate deflection of the conductive deflectable diaphragm when exposed to pressure of the process media.

11. The field device of claim 8, and further comprising an electronics housing coupled to the sensor body, the sensor circuitry and the transmitter circuitry being positioned in the electronics housing.

12. The field device of claim 8, and further comprising an evacuation port formed in the sensor body for evacuating the second chamber to form the vacuum dielectric.

13. The field device of claim 8, and further comprising an evacuation tube extending through the first chamber into the second chamber for evacuating the second chamber to form the vacuum dielectric.

14. A capacitive gage pressure transmitter comprising:

a capacitive gage pressure sensor configured to measure a gage pressure of a process media, the gage pressure sensor including:

a sensor body having first and second chambers formed therein, the second chamber being under vacuum and forming a vacuum dielectric for the gage pressure sensor;

an atmospheric reference port formed in the sensor body and maintaining a pressure of the first chamber in relation to an ambient atmospheric pressure surrounding the field device;

a process media inlet port configured to couple to a source of process media;

a conductive deflectable diaphragm disposed between the second chamber and the process media inlet port; and a metal electrode disposed in the second chamber in relation to the conductive deflectable diaphragm such that deflection of the conductive deflectable diaphragm generates a change in capacitance between the metal electrode and the conductive deflectable diaphragm, the capacitance being indicative of gage pressure of the process media;

sensor circuitry electrically coupled to the gage pressure sensor and configured to generate a sensor signal based upon the capacitance between the metal electrode and the conductive deflectable diaphragm; and transmitter circuitry coupled to the sensor circuitry to transmit information relative to the sensor signal over a process communication loop.

15. The transmitter of claim 14, and further comprising:

an insulator positioned in the sensor body, the metal electrode being disposed on the insulator; and a thin ring diaphragm physically coupled between the insulator and the sensor body, wherein the insulator and the thin ring diaphragm separate the first chamber from the second chamber.

16. The transmitter of claim 15, and further comprising an electronics housing coupled to the sensor body, the sensor circuitry and the transmitter circuitry being positioned in the electronics housing.

17. The transmitter of claim 16, and further comprising a low expansion spacer positioned between the insulator and the conductive deflectable diaphragm to facilitate deflection of the conductive deflectable diaphragm when exposed to pressure of the process media.

18. The transmitter of claim 17, and further comprising an evacuation port formed in the sensor body for evacuating the second chamber to form the vacuum dielectric.

19. The transmitter of claim 17, and further comprising an evacuation tube extending through the first chamber into the second chamber for evacuating the second chamber to form the vacuum dielectric.

20. The transmitter of claim 17, and further comprising a fitting for coupling the process media inlet port to the source of the process media.

* * * * *